C. A. BRUST.
SAW FILING OR GRINDING WHEEL.
APPLICATION FILED AUG. 7, 1916.

1,217,889.

Patented Feb. 27, 1917.

Witness
Elvan D. Haines.

Inventor
C. A. Brust.
By H. B. Willson & Co.
Attorneys

UNITED STATES PATENT OFFICE.

CHARLES A. BRUST, OF MEMPHIS, TENNESSEE.

SAW FILING OR GRINDING WHEEL.

1,217,889. Specification of Letters Patent. Patented Feb. 27, 1917.

Application filed August 7, 1916. Serial No. 113,582.

*To all whom it may concern:*

Be it known that I, CHARLES A. BRUST, a citizen of the United States, residing at Memphis, in the county of Shelby and State of Tennessee, have invented certain new and useful Improvements in Saw Filing or Grinding Wheels; and I do declare the following to be a full, clear, and exact description of the invention, such as will enable others skilled in the art to which it appertains to make and use the same.

This invention relates generally to filing or grinding devices, but more particularly to certain new and useful improvements in filing or grinding wheels used upon saw blades and the like.

The primary object of the invention is to provide a device of this character by which the rake and clearance edges of a saw tooth are ground or sharpened simultaneously.

Another object of the invention is to generally improve upon devices of this character by the provision of a device which will be simple, strong, durable and extremely inexpensive in construction, efficient and reliable in operation, and well adapted to the purpose for which it is designed.

With these and numerous other objects in view, the invention consists of certain novel features of construction and in the combination and arrangement of parts as will be hereinafter fully described and claimed.

In the accompanying drawing in which similar reference characters designate like parts throughout the several views.

Figure 1:
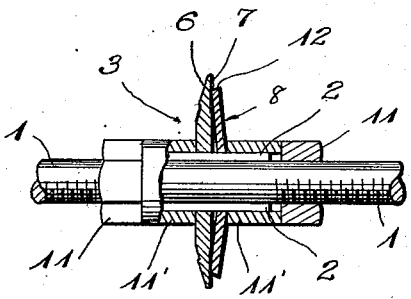
Figure 1 is a longitudinal sectional view, partly in elevation, of a wheel constructed in accordance with this invention.
Figure 2:
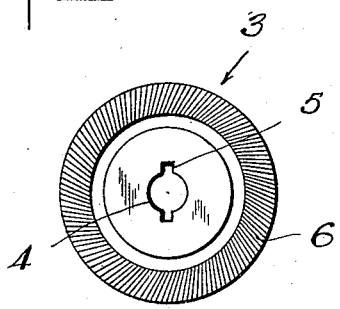
Figs. 2 and 3 are front elevations of the separate disks separated from their mountings.
Figure 3:
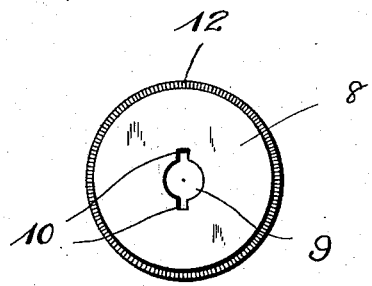

Referring more particularly to the drawing, the reference numeral 1 designates a mandrel upon which the filing or grinding wheel is fixed. It is to be understood that this mandrel 1 is revolubly mounted in the usual manner in a saw grinding machine (not shown). Arranged on the diametrically opposite sides of the mandrel 1 are longitudinally extending ribs 2, which form means for preventing rotation of the wheel to be presently described upon the same. The above referred to filing or grinding wheel comprises in its preferred embodiment a circular disk 3 having a centrally arranged opening 4 therethrough for the reception of the mandrel 1. The diametrically opposite edges of the opening 4 are notched out as at 5 to receive the ribs 2. The opposite sides of the disk 3 from points spaced inwardly of its periphery to the same are arranged in converging relation and formed into annular grinding or filing surfaces 6 and 7.

The reference numeral 8 designates a companion disk or plate which is arranged adjacent the disk 3 in concentric relation with the same, and is similarly provided with a central opening 9 having notches 10 on its opposite edges to receive the mandrel 1 and ribs 2. The two disks 3 and 8 are held in contacting relation in any suitable manner, but preferably by a pair of clamping nuts 11, one of the sides of which bear against spacing members 11' disposed adjacent the outer sides of the disks. As clearly shown by the drawings, the disk 8 is smaller in diameter than the disk 3, and has its edge inclined inwardly from its outer side to its inner side, and formed into a filing or grinding surface 12. The annular grinding surface 7 on the inner side of the larger disk 3 is spaced inwardly of the adjacent or smaller end of the disk 8 so that the forward or rake edge of the saw teeth may be ground to the extreme point thereof.

Figure 4:
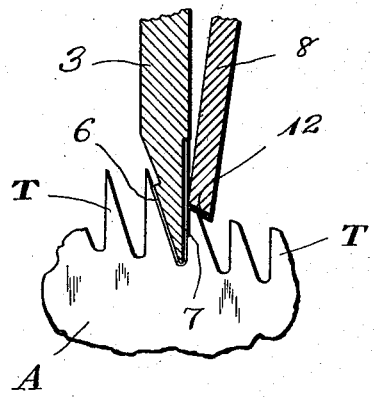
Fig. 4 is an enlarged vertical sectional view of a portion of the wheel, showing the same in operative engagement with the teeth of a saw.

The use of the invention is illustrated in Fig. 4 of the drawings, wherein a portion of a saw blade A is shown having as usual a series of teeth T. From this figure it may be seen that when the wheel is brought into operative engagement with the teeth of the blade, the grinding surface 7 will operate upon the forward or rake edge of the teeth, the surface 12 upon the clearance edge of the teeth, while the surface 6 will operate upon the rear or remaining edge of the adjacent teeth. By moving the blade either forwardly or backwardly depending upon the type of machine upon which the wheel is mounted, the corresponding parts of the next succeeding teeth will be ground, thus completely grinding the first operated upon teeth.

From the foregoing description, it may be seen that the object of the invention has been effectively carried out, as a filing or grinding wheel has been provided which will file or grind the rake and clearance edges of a saw or other blade simultaneously. Heretofore, this has been done by separate operations, by the use of a plurality of wheels and in a majority of cases the clearance edges of the teeth have not been ground at all. It is to be herein noted that I do not wish to be limited to the exact construction herein shown and described except in so far as required by the scope of the appended claim for the device may be equally adapted for use in filing or grinding saw blades having teeth of different configuration from that shown and described.

I claim:

A saw filing or grinding wheel of the class described comprising a pair of contacting companion disks of unequal diameters arranged in concentric relation to each other, the edge of the smaller disk being inclined inwardly from its outer to its inner side and having a grinding surface thereon for grinding the clearance edge of a saw tooth, the opposite sides of the larger disk from points spaced inwardly of its periphery to said periphery being disposed in converging relation and having annular grinding surfaces thereon, the annular grinding surface on the inner side of said larger disk having its inner edge disposed inwardly of the adjacent end of the smaller disk for grinding the forward or rake edge of the saw tooth to the extreme point of said tooth, the annular grinding surface on the outer side of the larger disk being adapted to grind the rear edge of the adjacent saw tooth, all of said grinding surfaces being adapted to act upon their respective edges of the saw teeth simultaneously.

In testimony whereof I have hereunto set my hand in the presence of two subscribing witnesses.

CHARLES A. BRUST.

Witnesses:
L. C. RUTLAND,
J. W. MONTGOMERY.

Copies of this patent may be obtained for five cents each, by addressing the "Commissioner of Patents, Washington, D. C."